INVENTORS
STUART D. POMPIAN
CHARLES S. NAIMAN

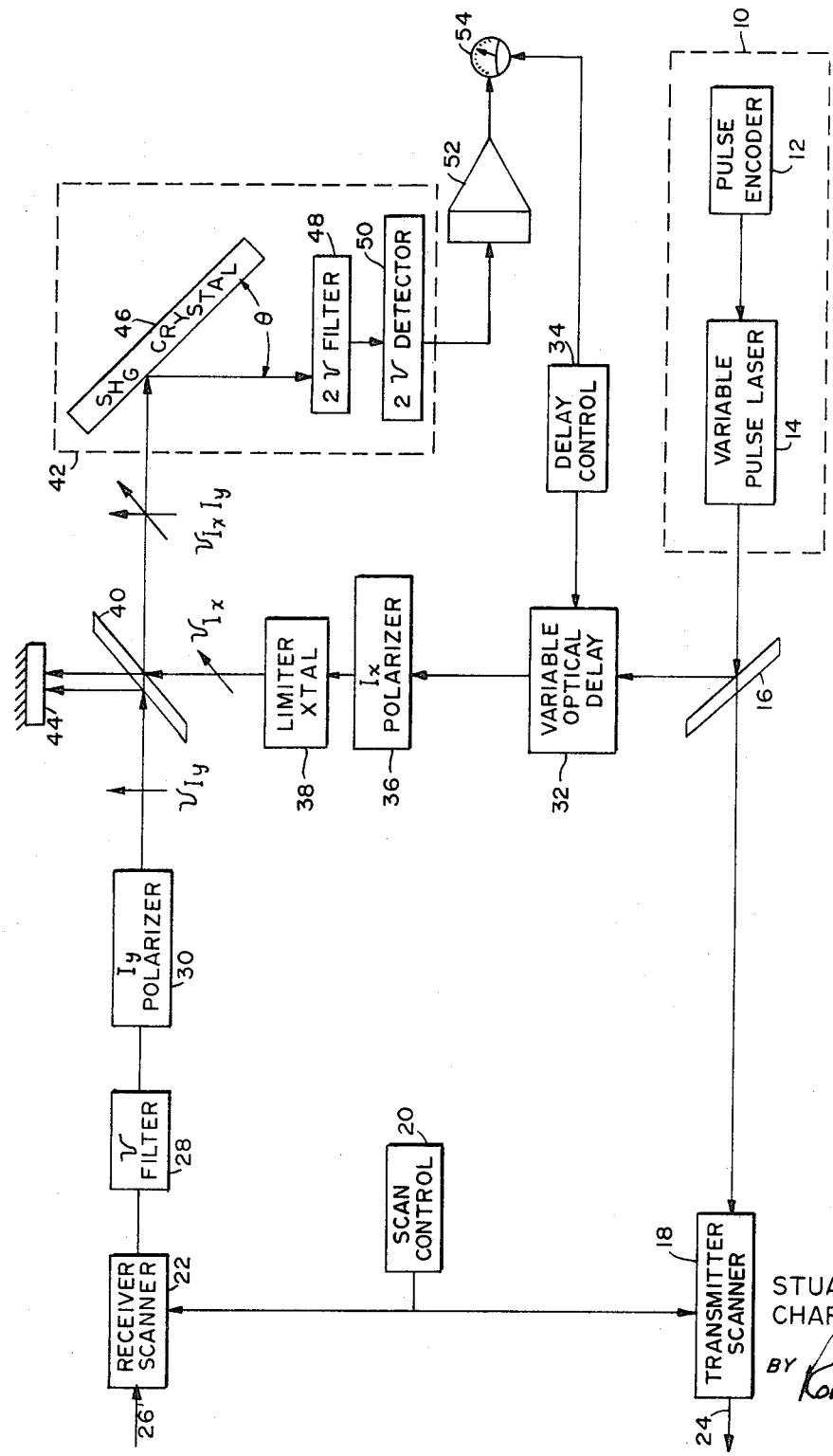

United States Patent Office 3,676,003
Patented July 11, 1972

---

3,676,003
LASER RADAR SYSTEM
Charles S. Naiman, Brookline, and Stuart D. Pompian, Waban, Mass., assignors to Sanders Associates, Inc., Nashua, N.H.
Filed June 4, 1970, Ser. No. 43,458
Int. Cl. G01c 3/08
U.S. Cl. 356—5
13 Claims

ABSTRACT OF THE DISCLOSURE

An improved laser radar system comprises a variable pulse laser transmitter a portion of the output of which is delayed, polarized in a first direction and limited to a maximum intensity value. The remainder of the transmitter output is directed to a remote target whereby it is reflected back to the receiver. The received reflected energy is filtered and polarized in a second direction normal to the said first direction. The received and delayed energy is combined and directed to a second harmonic generating crystal at a predetermined orientation. Only energy having both orthogonal polarization components operates to produce second harmonic energy which is filtered and detected by a second harmonic detector. The detector output signal is compared with the delayed signal to establish the distance to the target.

BACKGROUND OF THE INVENTION

Field of the invention

The present invention relates generally to the field of electro-optical distance measuring equipment and in particular to such equipment employing a harmonic generating element in a nonlinear laser correlator receiver.

Description of the prior art

Prior to the present invention laser distance measuring equipment consisted essentially of a transmitter having a portion of its output split off to form a local oscillator signal. The energy reflected from the target was compared in phase to the local oscillator signal to determine the range to the target. A device of this nature is disclosed in U.S. Pat. No. 2,966,090 entitled "Optical Distance Measuring Device" which issued to K. O. R. Schöldstrom on Dec. 27, 1960. A significant limitation is involved with the use of a device such as that disclosed; specifically the detector or receiver must be spectrally matched to the transmitter. A problem arises in that there are a variety of laser sources which are highly desirable for use in such systems but satisfactory detectors are not available. In particular, the Er$^{+3}$ doped class of lasers are desirable from the standpoint of avoiding radiation wavelengths which are hazardous to the human eye. Host materials such as glass, yttrium-aluminum-garnet, fluoro-apatite or barium magnesium germanate doped with Er$^{+3}$ all operate between 1.5 and 1.6 microns which is relatively non-hazardous to human eyes as well as non-visible. The absence of satisfactory detectors at this wavelength, however, has limited the application of such sources to the laser radar field.

OBJECTS AND SUMMARY OF THE INVENTION

It is therefore a primary object of the present invention to provide a new and novel laser radar system.

It is another object of the present invention to provide apparatus of the above-described character employing a pulse code modulated laser source.

It is an additional object of the present invention to provide apparatus of the above-described character having a nonlinear laser correlator.

It is a further object of the present invention to provide apparatus of the above-described character having a second harmonic generating converter at the receiver.

The foregoing objectives are accomplished by providing a pulse code modulated laser transmitter a portion of the output of which is delayed, polarized in a given direction and limited to a preselected intensity level. The energy reflected from the target is filtered and polarized in a direction normal to the delayed signal. The reflected and delayed signals are combined and directed to a second harmonic generating crystal oriented such that only energy having both of the orthogonal polarization components will give rise to energy at the second harmonic. This second harmonic energy is passed through a narrow band filter and detected. The detector output is integrated and applied to a phase comparator which provides an output indicative of the target range. The laser transmitter operates at a wavelength which is relatively harmless to human eyes and difficult to detect but is frequency doubled at the receiver prior to detection. In one embodiment a 1.6 micron Er$^{+3}$ doped laser is employed with a polycrystalline zinc telluride harmonic generating crystal and a conventional photocathode surface.

These and other objects, features and advantages of the present invention will become more apparent from the following detailed description taken in conjunction with the appended drawings.

BRIEF DESCRIPTION OF THE DRAWINGS

FIG. 1 is a schematic block diagram of a laser radar system fabricated in accordance with the principles of the present invention.

DESCRIPTION OF THE PREFERRED EMBODIMENT

Figure 2A:
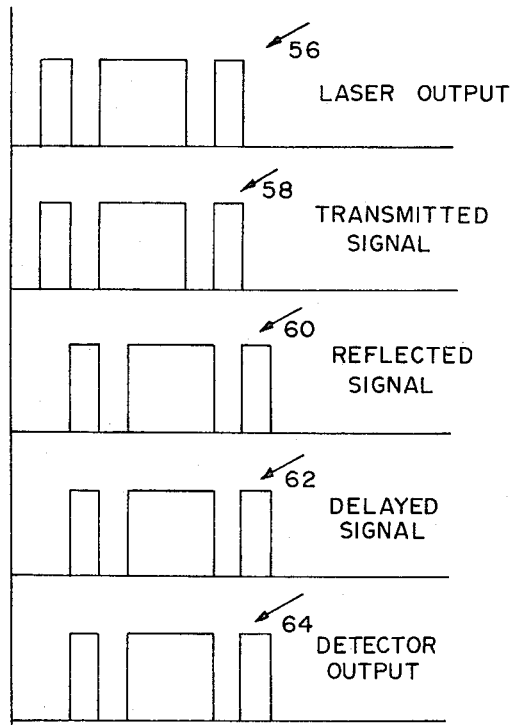
FIGS. 2A and 2B graphically illustrate the pulse code phase and detector output signal from the apparatus of FIG. 1 for two target range conditions.

Turning now to FIG. 1 there is schematically illustrated a laser radar system according to the present invention. The transmitter 10 is pulse code modulated and comprises a pulse encoder 12 and a variable pulse laser 14. A laser which is suitable for use in the practice of the present invention is described in co-pending application, Ser. No. 847,795 of Jacob Schwartz for "Variable Pulse Laser" which is assigned to the same assignee as the present application. The laser disclosed therein includes a control element whereby the output pulse length and therefore pulse code modulation may be achieved by controlling the intensity of the laser flashlamp. Although a laser of this type is generally preferred in the practice of the present invention, laser diodes including the bulk semiconductor types pumped either optically or with an electron beam may provide pulse code modulated outputs if the current supplied to the diode is suitably controlled. Gas lasers or other continuous type lasers with provisions for electro-optical cavity dumping could also provide the desired pulse length control.

The pulse code modulated output of the laser 14 passes through a beam splitter 16 where a small portion of the transmitted energy is split off as a reference. The bulk of the transmitted energy is passed through the beam splitter 16 to an electro-optical transmitter scanner 18. Scanners suitable for use in the present invention are known in the art and generally comprise electro-optical prisms formed of suitable materials such as barium titanate or the like which change their index of refraction as a function of an electric field applied from a scan control means 20 when maintained in a suitable thermal environment. The number and complexity of prisms required depends upon the field of view which it is necessary to cover. The scan control electronics unit 20 also has its output coupled to an electro-optical receiver scanner 22 such that at any given point in time both the transmitter and receiver cover properly related fields of view.

The energy 24 transmitted by the transmitter scanner 18 is directed to a remote target (not shown) whereby it is reflected and at least a portion 26 thereof is returned to the receiver scanner 22. The reflected energy incident on the receiver scanner 22 is passed through a narrow bandpass filter 28 centered on the fundamental frequency, $\nu$, of the laser 14 thus removing the large majority of background radiation. The received energy is then passed through a first polarizer 30 whereby it is polarized in a first direction to provide an optical signal, $I_y$.

That portion of the pulse code modulated transmitter 10 output which is split off by beam splitter 16 is directed to a variable optical delay means 32. The preferred variable optical delay line uses the Hahn and McCall self-induced transparency effect wherein the delay provided depends upon the relative populations between ground and excited states and/or angular effects of the direction of the laser beam with respect to the crystalline axis of a transparency rod. A detailed discussion of this effect may be found in "Self-Induced Transparency by Pulsed Coherent Light" by S. L. McCall and E L. Hahn in Physical Review Letters, vol. 18, No. 21 of May 22, 1967. The delay characteristics are controlled by a delay control means 34. In the alternative a variably repeated second pulse from the transmitter 10 may be used with continuous wave lasers operated in the cavity dumping mode or with suitably pulsed semi-conductor lasers. A further alternative means for providing a variable optical delay would be similar to that shown in the above-referenced patent to Schöldstrom wherein variably spaced reflecting surfaces are placed in the optical path. As stated above an optical delay line based upon the Hahn and McCall self-induced transparency effect is preferred in that should amplification of the beam be necessary and may be provided with good amplitude stability of the beam intensity in polarization.

After a suitable delay the energy exits the delay line 32 and is passed through a second polarizer 36 where it is polarized in a direction orthogonal to the direction of the above-described $I_y$, optical signal. This signal is designated $I_x$ and is incident on an optical limiter crystal 38 whereby it is intensity limited to a preselected maximum level. The fundamental frequency energy at $I_x$ and $I_y$ are combined in a beam combiner 40 and the resulting combined beam which contains both of the orthogonal polarization components $I_x$ and $I_y$ is directed to a non-linear correlation receiver 42. That portion of the $I_x$ and $I_y$ optical signals passed and reflected respectively by the beam combiner 40 in the direction normal to the desired path to the receiver 42 is incident on a radiation absorber 44 such that it is not reflected back into the system.

The non-linear correlation receiver 42 comprises a second harmonic generating crystal 46 such as potassium dihydrogen phosphate, lithium niobate or the like, disposed at a preselected orientation, $\theta$, with respect to the combined beam, such that the second harmonic $2\nu$ is generated only when the impinging beam contains both of the orthogonal polarization components $I_x$ and $I_y$. Due to the particular orientation of the crystal 46, second harmonic energy will not be generated in response to an optical signal having only the $I_x$ or $I_y$ polarization component. It is specifically to be noted that the present invention employs non-linear optical correlation as distinct from optical heterodyning where optical energy of two different frequencies are combined to produce energy at some third frequency. The second harmonic energy is passed through a narrow band filter 48 centered on $2\nu$ to a detector 50 having a peak response at the second harmonic. Detectors suitable for use in the practice of the present invention are of the conventional type and include S-1 or S-20 surface photocathodes or silicon photodetectors. It will be apparent that since the detector 50 is exposed only to radiation at the second harmonic which in space can only come from the suitably oriented non-linear second harmonic generating crystal 46 the detector output contains an extremely low level of background noise from the outside field of view. The electrical signal from the detector 50 as coupled through an integrator 52 to a range readout means 54 which could be of any suitable type such as a cathode ray tube, image tube, digital indicator or the like.

Figure 2B:
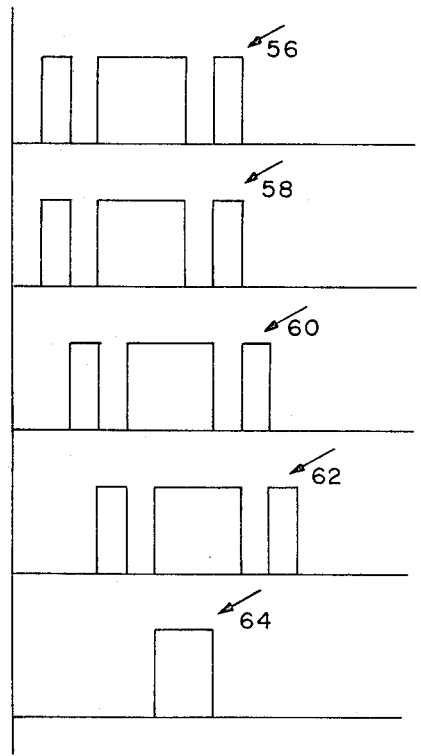

The pulse code phase and detector output signals from the apparatus of FIG. 1 are illustrated in FIG. 2A for a condition where the optical delay provided corresponds to the range to the target and in FIG. 2B where the delay is less than that corresponding to the target range.

In FIG. 2A pulse train 56 is the pulse code modulated output of the variable pulse laser transmitter. This same signal of course exits the transmitter scanner as shown by pulse train 58. The transmitted pulses are incident on a remote target and are reflected back as pulse train 60 with a delay corresponding to the two way path length to the target. After filtering and polarizing the pulse train 60 makes up the $I_y$ optical signal discussed above. The delayed optical signal is polarized in the $I_x$ direction and the pulse train 62 is in phase with pulse train 60 and all elements of the combined beam incident on the harmonic generating crystal result in the generation of second harmonic energy. The detector output 64 thus is of the same form as the transmitted signal.

In FIG. 2B the puse trains 56, 58 and 60 correspond to the like numbered pulse trains shown in FIG. 2A. The internally delayed pulse train 62, however, has been delayed by a time in excess of that corresponding to the target range. The combined $I_x$ and $I_y$ optical signals are not in phase and thus only that portion of the combined pulse train having both $I_x$ and $I_y$ polarization components gives rise to second harmonic energy and the detector output signal 64 is only a single pulse.

As an illustrative example an erbium$^{+3}$ doped YAG laser which operates at about 1.6 microns may be used as a transmitter source. A $\overline{43}M$ class zinc telluride crystal oriented with its 001 direction parallel to the combined beam converts the properly polarized energy at 1.6 microns to the second harmonic at 0.8 micron. The applicants by employing a second harmonic converter at the receiver have thus provided a laser system which has all of the advantages of operation at both 1.6 and 0.8 microns while overcoming the difficulties involved with each of these wavelengths. Specifically, all energy which is transmitted outside the system itself has a wavelength of 1.6 microns which lies within a region of relatively high atmospheric transmission and is relatively non-hazardous to the human eye. This wavelength energy is also very difficult to detect since the response characteristics of known photodetectors fall off to essentially non-usable values for energy beyond about 1.1 microns. The system is thus ideally suited to covert operation since the transmitted energy is in the non-visible portion of the spectrum and conventional warning systems would not sense the illuminating energy. By converting to the second harmonic in the receiver the use of conventional, commercially available, high gain photodetectors such as S-1 or S-20 photocathode surfaces or silicon photoconductors is permitted which greatly simplifies the system electronics.

Figure 3:
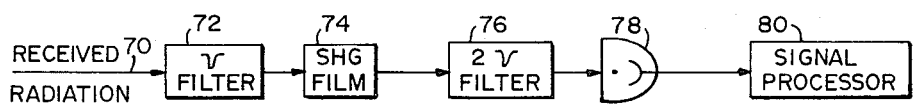
FIG. 3 is a schematic illustration of a simplified alternative embodiment of the receiver.

Turning now to FIG. 3 there is schematically illustrated a simplified alternative embodiment of the receiver portion of the present invention. This embodiment dispenses with optical correlation and thus is amendable for use in applications where received power is higher. In this embodiment the received radiation 70, either reflected from a target or from a remote laser transmitter of a communications system is incident on a narrow band pass filter 72 centered on the fundamental frequency $\nu$ whereby the bulk of any background radiation is removed. The energy at the fundamental is then converted to the second harmonic, $2\nu$, by a non-phase matched second harmonic generator 74 which may be in the form of a thin polycrystalline film. The permissible use of non-phase matched second harmonic generator is a significant improvement over the prior art wherein such materials were generally discounted as unusable. The energy exiting the second harmonic generator 74 then passes through a narrow bandpass filter 76 centered on the second harmonic frequency, $2\nu$, and is incident on a conventional photocathode 78 which preferably has a peak sensitivity at the second harmonic and produces an electrical output signal which may be coupled to a suitable signal processing means 80.

A particular form of this embodiment which is well suited for use in covert radar and/or communications systems involves the use of an $Er^{+3}$ laser source and a thin layer of polycrystalline zinc telluride as the second harmonic generator. Although FIG. 3 shows the optical filters, harmonic generator and phototube as separate elements in practice the second harmonic filter, harmonic generator and fundamental filter may be deposited directly on the photocathode housing. The thickness of the harmonic generator may be optimized for efficiency of second harmonic generation by selecting a film thickness approximately equal to the second harmonic coherence path length. This thickness in the case of polycrystalline zinc telluride is about $2 \times 10^{-4}$ cm. In such a system all energy which is transmitted outside the system itself is at a nonvisible and non-hazardous wavelength of 1.6 microns but detection is performed on energy at 0.8 micron which may be accomplished with relative ease.

It will thus be seen that the objects set forth hereinabove, among those made apparent from the preceding description are efficiently attained and, since certain changes may be made in the above construction without departing from the scope of the invention, it is intended that all matter contained in the above description or shown in the appended drawings shall be interpreted as illustrative and not in a limiting sense.

Having described what is new and novel and desired to secure by Letters Patent, what is claimed is:

1. A laser radar system comprising
   means for generating modulated coherent optical energy of a fundamental frequency,
   means for directing a portion of said fundamental frequency optical energy to a remote reflective target,
   means for collecting fundamental frequency optical energy,
   means for polarizing said collected fundamental frequency energy in a first direction,
   means for dividing out a portion of said generated modulated coherent energy of a fundamental frequency,
   variable optical delay means for delaying said divided energy for a preselected variable period of time,
   means for polarizing said divided and delayed energy in a second direction orthonogal to said first direction,
   means for combining said collected and delayed fundamental frequency energy of first and second polarization,
   means responsive to said fundamental frequency optical energy having both first and second polarization to generate optical energy at a harmonic of said fundamental frequency,
   detecting means for producing an electrical output signal in response to said harmonic frequency optical energy and
   signal processing means coupled to said detecting means.
2. Apparatus as recited in claim 1 further including
   a first optical bandpass filter having a bandpass centered substantially at said fundamental frequency and interposed between said collecting means and said combining means.
3. Apparatus as recited in claim 2 further including
   a second optical bandpass filter having a bandpass centered substantially at said harmonic frequency and interposed between said harmonic generating means and said harmonic detecting means.
4. Apparatus as recited in claim 1 wherein
   said means for generating modulated coherent optical energy of a fundamental frequency comprises a pulse code modulated laser.
5. Apparatus as recited in claim 4 wherein
   said laser comprises a host material doped with $erbium^{+3}$.
6. Apparatus as recited in claim 1 wherein
   said directing means and said collecting means each comprise electro-optical prisms which have indices of refraction which vary as a function of an electrical field applied thereto, and means for applying a controllably variable electrical field to each of said electro-optical prisms.
7. Apparatus as recited in claim 1 wherein
   said variable delay means comprises a transparency rod in which the speed of optical energy therein may be varied.
8. Apparatus as recited in claim 1 wherein
   said harmonic generating means comprises a second harmonic generating crystal oriented with respect to said combined energy such that said second harmonic optical energy is generated only in response to fundamental frequency optical energy having both of said orthogonal first and second polarization.
9. Apparatus as recited in claim 5 wherein
   said harmonic generating means comprises a $\overline{43}M$ class zinc telluride crystal oriented with the 001 direction thereof toward said fundamental frequency energy.
10. Apparatus as recited in claim 5 wherein
    said harmonic generating means comprises a polycrystalline film of zinc telluride disposed on the surface of said harmonic frequency optical energy detecting means.
11. Apparatus as recited in claim 10 wherein
    the thickness of said polycrystalline film is substantially equal to the second harmonic coherence path length of said zinc telluride.
12. Apparatus as recited in claim 1 wherein
    said signal processing means comprises means for intregrating said electrical output signal of said harmonic frequency optical energy detecting means.
13. Apparatus as recited in claim 12 further including
    means coupled to said integrating means and to said variable delay means for indicating the degree of coincidence of said collected and delayed fundamental frequency optical energy.

References Cited
UNITED STATES PATENTS

| | | | |
|---|---|---|---|
| 3,293,438 | 12/1966 | Davis, Jr. | 250—199 |
| 3,430,047 | 2/1969 | Hurkamp | 250—199 |
| 3,502,879 | 3/1970 | Vallese | 250—199 |
| 3,503,682 | 3/1970 | Botcherby | 356—4 |

BENJAMIN A. BORCHELT, Primary Examiner

S. C. BUCZINSKI, Assistant Examiner

U.S. Cl. X.R.

356—4; 250—199